(12) United States Patent
Martinez Chavoy et al.

(10) Patent No.: US 9,076,279 B2
(45) Date of Patent: Jul. 7, 2015

(54) COIN CONVEYOR FOR COIN PROCESSING MACHINES

(71) Applicant: AZKOYEN, S.A., Peralta (Navarra) (ES)

(72) Inventors: Alvaro Martinez Chavoy, Peralta (ES); Jose Manuel Navarro Cueva, Peralta (ES); Miguel Angel Calleja Lafuente, Peralta (ES)

(73) Assignee: AZKOYEN, S.A., Peralta (ES)

( * ) Notice: Subject to any disclaimer, the term of this patent is extended or adjusted under 35 U.S.C. 154(b) by 0 days.

(21) Appl. No.: 14/264,543

(22) Filed: Apr. 29, 2014

(65) Prior Publication Data

US 2014/0323024 A1     Oct. 30, 2014

(30) Foreign Application Priority Data

Apr. 29, 2013   (ES) .................................. 201330617
Feb. 5, 2014   (ES) .................................. 201430146

(51) Int. Cl.
     *G07D 9/00*       (2006.01)
     *B65G 21/20*      (2006.01)
     *G07D 1/00*       (2006.01)
     *G07D 11/00*      (2006.01)

(52) U.S. Cl.
CPC .................. *G07D 9/008* (2013.01); *G07D 1/00* (2013.01); *G07D 11/0003* (2013.01); *B65G 21/209* (2013.01); *G07D 9/00* (2013.01)

(58) Field of Classification Search
CPC .............................. G07D 1/00; G07D 11/0003
USPC .................................................. 453/7, 11, 56
See application file for complete search history.

(56) References Cited

U.S. PATENT DOCUMENTS

| 3,837,454 A * | 9/1974 | Joeck ............................. 194/318 |
| 4,072,156 A | 2/1978 | Abe |
| 5,163,868 A * | 11/1992 | Adams et al. .................... 453/11 |
| 5,496,211 A * | 3/1996 | Zimmermann .................... 453/3 |
| 2004/0035673 A1 * | 2/2004 | Hibari ............................ 194/320 |

FOREIGN PATENT DOCUMENTS

| EP | 2270755 A1 | 1/2011 |
| JP | H03-018988 A | 1/1991 |

* cited by examiner

*Primary Examiner* — Mark Beauchaine
(74) *Attorney, Agent, or Firm* — Lucas & Mercanti, LLP

(57) ABSTRACT

Coin conveyor for coin processing machines, with a channel having: a first coin (16) reception segment (1), defined by a longitudinally movable wall (5) and by an opposite fixed wall (10), both converging towards each other towards the inside of said channel; a second coin transportation and alignment segment (2), defined by a longitudinally movable wall (5), by an opposite fixed wall (10) and by an also fixed bottom (12); a third coin separation segment (3), defined by the lateral surface of a freely rotating cylindrical roller (14), by a longitudinally movable wall (5), by an opposite fixed wall (10) supported on the lateral surface of said cylindrical roller along the length of an arch of approximately 90°, and by a fixed bottom (12); and a fourth coin delivery segment (4), defined by a longitudinally movable wall (5) and by an also fixed bottom (12). The longitudinally movable wall (5) of all segments is constituted by a single endless belt being mounted on pulleys (6-6').

26 Claims, 17 Drawing Sheets

COIN CONVEYOR FOR COIN PROCESSING MACHINES

CROSS-REFERENCE TO RELATED APPLICATIONS

This application claims the priority of ES P201330617 filed Apr. 29, 2013, and ES P201430146 filed Feb. 5, 2014, which are incorporated by reference herein.

TECHNICAL FIELD

The present invention relates to a coin conveyor especially applicable to coin processing machines in charge of the admission, sorting, storage and dispensing of coins. This type of machines is used for the admission of coins and the giving of change during a cash transaction.

BACKGROUND ART

The transportation of coins in coin processing machines is usually carried out through the action of belts that, through friction or through protrusions provided for said purpose, drag the coins through the established course. This way, document JPH3018988A provides the way in which the coins are dragged by means of a set of belts with a circular section referenced to a lateral wall through the action of inclined belts. The device is complex and the elevated degree of friction with the coins can cause a premature wear and tear in the toroidal belts that are overstretched and cause failures in the transportation of the coins by failing to have a reinforcement or inner core.

Document EP2270755A1 uses a belt with dragging pivots to secure the transportation of the coins. This device requires the coin dispenser located before the transport to be synchronized with the housings defining the aforementioned stops. These types of belts are especially built and suppose an increase in the costs of the mechanism.

Document U.S. Pat. No. 4,072,156 shows another device that incorporates toroidal belts, wherein the change of trajectory of the coins is solved by means of inclined pulleys, making the device quite complex and expensive to make.

DETAILED SUMMARY OF THE INVENTION

The object of the present invention is a coin conveyor for coin processing machines that solves the aforementioned inconveniences with the incorporation of a coin dragging device that collects the coins one by one at a coin collection zone, located at a point below the conveyor, and leads them, by lifting them, to a delivery zone, where it takes them, one by one, with a certain separation among the same.

The conveyor of the invention is configured in the shape of a channel comprising a first coin reception segment, a second coin transportation and alignment segment, a third coin separation segment, and a fourth coin delivery segment, one by one and with a certain separation among the same.

The first coin reception segment is delimited by two walls that converge towards each other and towards the inside of the channel. One of these walls is longitudinally movable, while the opposite is fixed. The two walls delimiting the channel converge towards the inside thereof until reaching a minimum separation with a width smaller than the thickness of the coin with the smallest admissible thickness.

The second segment of the channel, the coin transportation and alignment segment, is defined by a longitudinally movable wall, by an opposite fixed wall and by an also fixed bottom.

On the other hand, in the third segment, which serves to separate the coins, the channel is defined by the lateral surface of a freely rotating cylindrical roller, by a longitudinally movable wall that is supported on the lateral surface of said cylindrical roller along an arch of approximately 90°, and by a fixed bottom.

Lastly, in the fourth segment, the coin delivery segment, the channel is defined by a longitudinally movable wall, an opposite fixed wall, and an also fixed bottom.

The longitudinally movable wall of all the segments of the channel is constituted by a single endless belt mounted on pulleys. Likewise, the bottom of the second, third and fourth segments is defined by a flat and continuous platform.

Along the first segment of the channel, the endless belt is supported, through its inner and outer surfaces, on the lateral surface of two conical rollers limiting this first segment. The shafts of the two conical rollers are parallel to the shafts of the pulleys on which the belt forming the movable wall of the different segments is mounted. In addition, the two conical rollers taper in different directions. The two conical rollers cause the transversal inclination of the belt, such that it converges with the fixed wall towards the inside of the channel. These rollers also cause a slight change of direction in the direction of travel of the belt.

In the first segment of the channel, the fixed wall is transversally curved, at least in its inner part, the concavity being directed towards the longitudinally movable wall, with which it also converges by its inner longitudinal edge. The lower part of this channel, with its concavity, serves as means of support for the coins.

In this first segment of the channel, the longitudinally movable wall and the fixed wall converge towards each other, in the transversal direction, towards the inside of the channel, and in the longitudinal direction in the direction of travel of the longitudinally movable wall, ensuring a minimum separation between the two walls smaller than the thickness of the coin with the smallest admissible thickness.

The second segment of the channel has means to drive the coins running through the length of said segment towards the bottom thereof to ensure the support of the coins on said bottom. Said means can consist of a trigger located in front of the channel and driven elastically towards the bottom thereof, such that it is supported on the rim of the coins running along the length of this segment of the channel. With this trigger, the coins are driven and supported on the bottom of the channel. The aforementioned means can also consist of a rotating wheel located in front of the second segment of the charnel, with the axle parallel to the bottom of the channel and perpendicular to the direction of movement of the coins along the length of this second segment of the channel, this wheel being elastically driven towards the bottom of the channel such that it is elastically supported on the rim of the coins running through said segment and the same effect is achieved than with the trigger.

The rotating wheel can be mounted on a pivoting support arranged in front of the channel by means of a hinge shaft parallel to the axle of the wheel. The pivoting support is elastically driven towards the bottom of the channel by means of a spring, being able to pivot around the hinge shaft between a position of minimum separation with respect to said bottom, where said wheel is separated from the bottom of the second segment of the channel a distance smaller than the diameter of the coin with the smallest admissible diameter, and a position of maximum separation, where the wheel is separated from said bottom a distance at least equal to the diameter of the coin with the greatest admissible diameter, such that the support of the wheel on the rim of the coin running under the means described above at any time is always ensured.

Preferably, the rotating wheel is provided with a non-skid peripheral finish with respect to the rim of the wins, with a high friction coefficient on said rim. In order to achieve the foregoing, the periphery of the rotating wheel can be provided with an elastomer-based coating or have a toothed profile surface.

The rotating wheel can freely rotate, such that the rotation of said wheels takes place when they are supported on the rim of a coin due to the effect of the movement of said coin.

According to a preferred embodiment, the rotating wheel is related to an actuation mechanism, such that it becomes a drive wheel, which tangential velocity will be equal or similar to the movement velocity of the coins, admitting a sufficient velocity tolerance such that a velocity control becomes unnecessary.

The actuation mechanism can include a motor to cause the rotation of the wheel through a reduction gear. The actuation of the rotating wheel can also be achieved by means of the same mechanism that actuates the belt constituting the movable wall of the channel and even by means of the direct coupling to said belt.

By means of the actuation of the rotating belt, the action thereof on the coins is ensured without it stopping or altering the movement of the coins.

The freely rotating cylindrical roller forming one of the lateral surfaces of the third segment of the channel acts as a pulley to change the course of the direction of travel of the belt, between the coin transportation and delivery segments. The belt forming the longitudinally movable wall of this segment is elastically supported on the periphery of said cylindrical roller along an arch of approximately 90°.

The third coin separation segment is located at a height above the first coin reception segment, the channel running between said segments having a backwards inclination in the ascending direction. The channel runs longitudinally in the horizontal position along the fourth segment.

Preferably, the endless belt making up the movable wall of the different segments of the channel will have a rectangular section, with transversally toothed inner and outer surfaces to ensure the dragging of the coins and the support thereof on the truncated cone-shaped rollers limiting the first segment of the channel.

BRIEF DESCRIPTION OF THE DRAWINGS

The attached drawings show an embodiment of the conveyor of the invention, provided as a non-limitative example. In the drawings.

DETAILED SUMMARY OF AN EMBODIMENT

The constitution and operation of the transportation of the invention will be better understood with the following description, made with reference to the embodiment shown in the attached drawings.

The coin conveyor of the invention is applicable to coin processing machines, such as the ones used in the acceptance and dispensation of coins in cash transactions and runs between a coin collection zone and a coin delivery zone located above the collection zone. The function carried out by the conveyor of the invention is to transport the coins it receives in a lower coin collection zone one by one, to lift them to an upper delivery zone, and during transportation, to mechanically reference them to a fixed surface. If there are two coins that are too close to each other during the transportation, the conveyor separates them to facilitate the sorting to be carried out in a subsequent phase, at the exit of the upper delivery segment.

Figure 1:
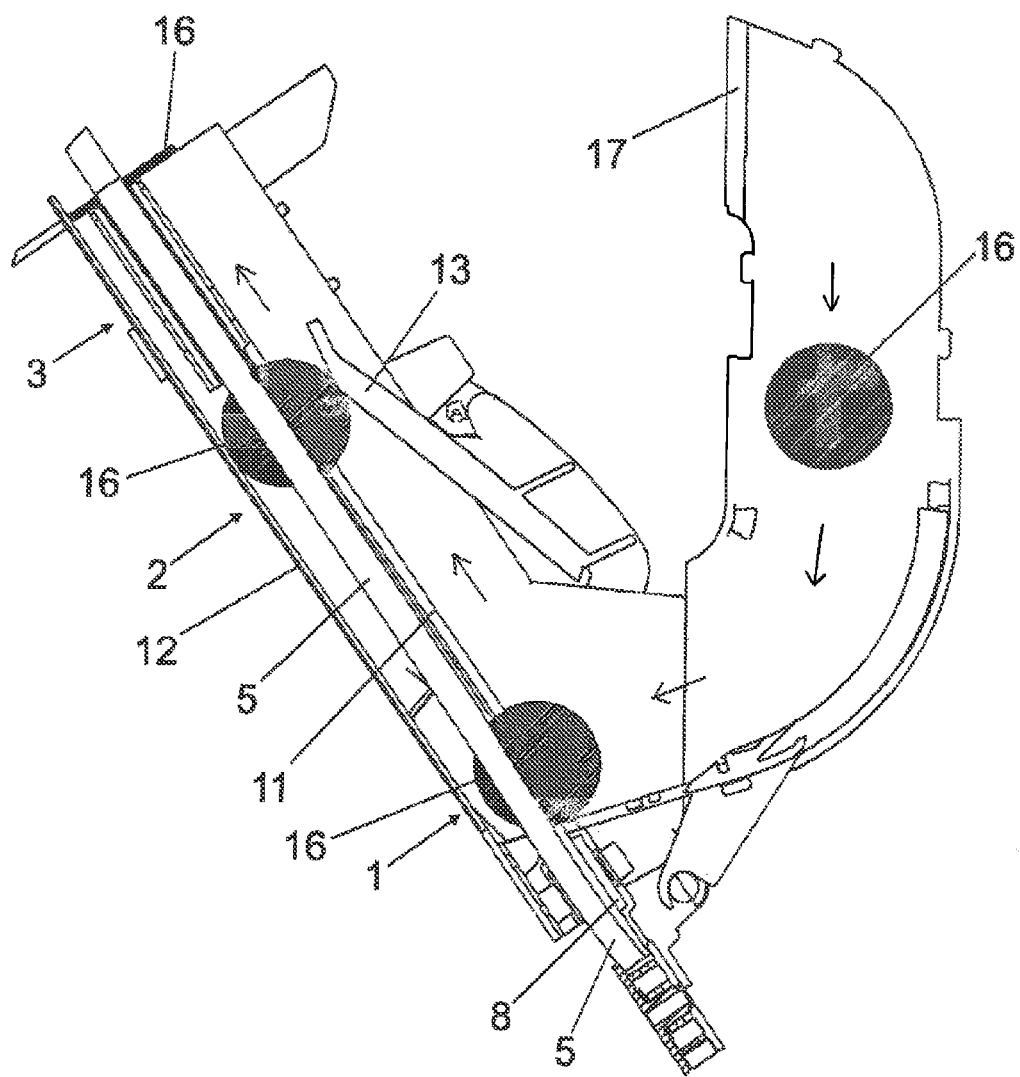
FIG. 1 is a lateral view of the conveyor of the invention.
Figure 2:
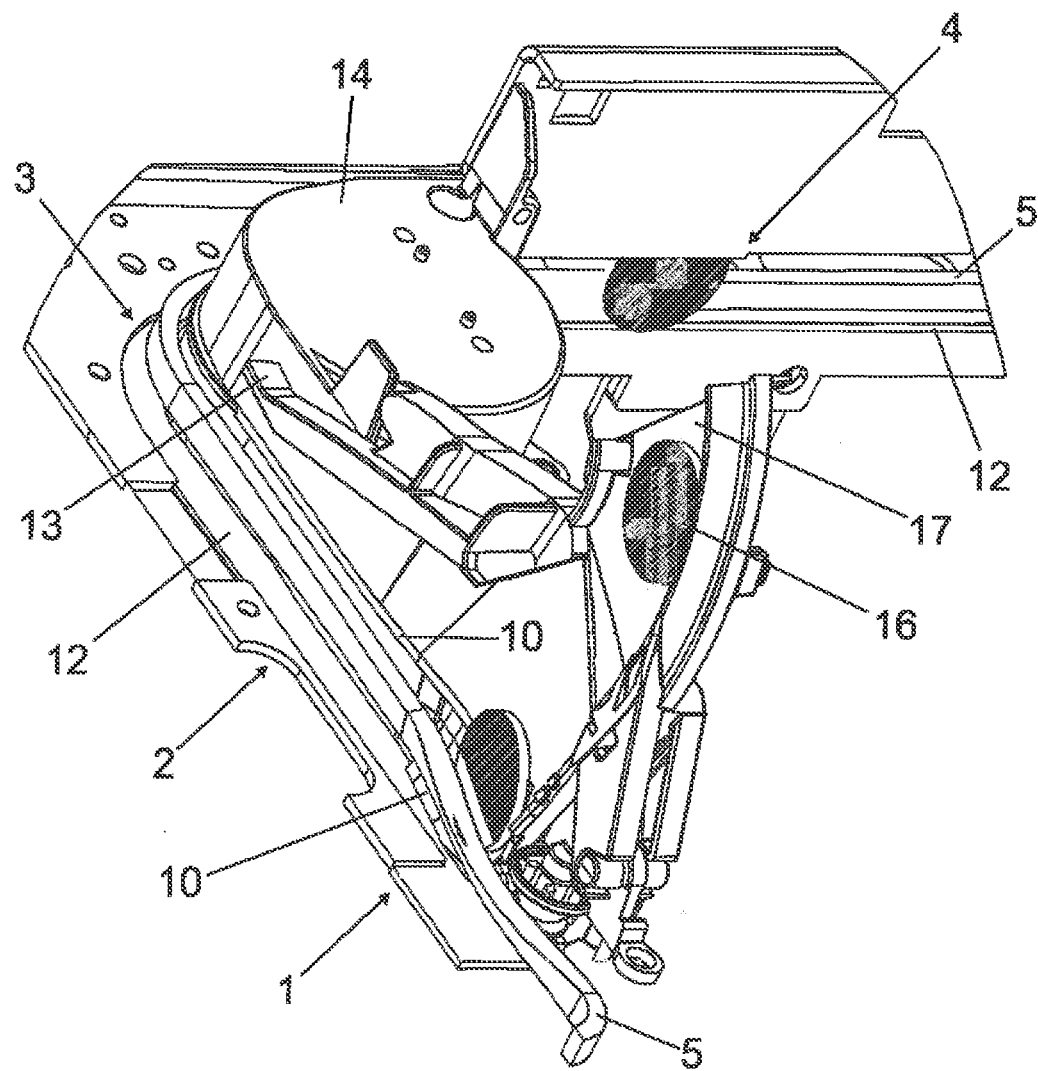
FIG. 2 is a perspective view of the same conveyor.
Figure 3:
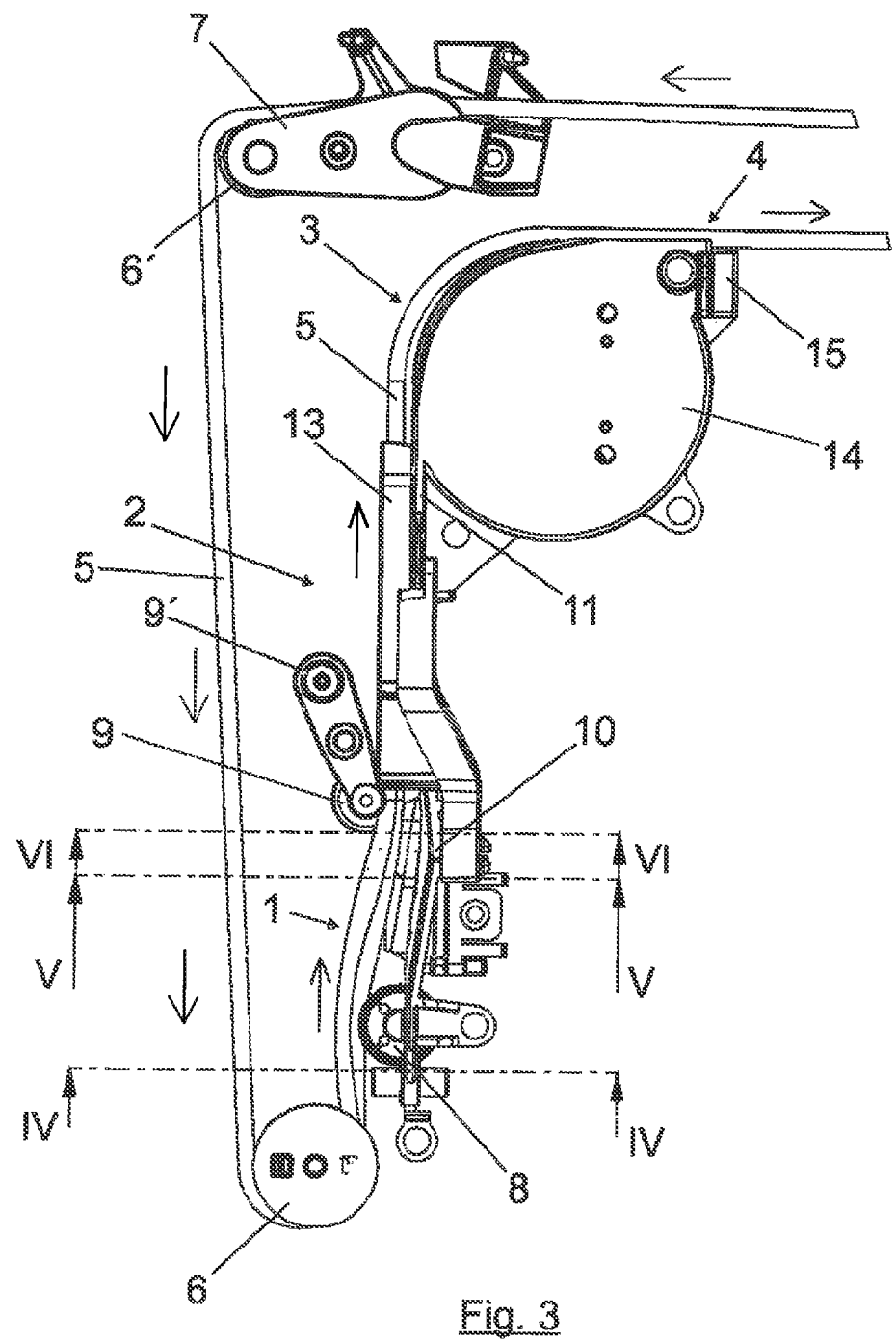
FIG. 3 is a plant view of the conveyor of FIGS. 1 and 2.

The conveyor of the invention, FIGS. 1, 2 and 3. It is constituted by a channel configuring four successive segments: a first (1) coin reception segment, a second (2) coin transportation and alignment segment, a third (3) coin separation segment, and a fourth (4) coin delivery segment.

The first and third segments, which constitute the coin reception and separation points, respectively, are located at different heights, the third segment (3) being located above the first segment (1), such that the second segment (2) runs in the ascending direction with a slight backwards inclination.

The outer wall (5) of the channel is longitudinally movable and is constituted by an endless belt that is mounted, FIG. 3, between pulleys (6-6'), of which one of them (6') is held by a tensioner (7) in charge of maintaining the tension of the belt and allowing certain changes in the development of its path.

Figure 4:
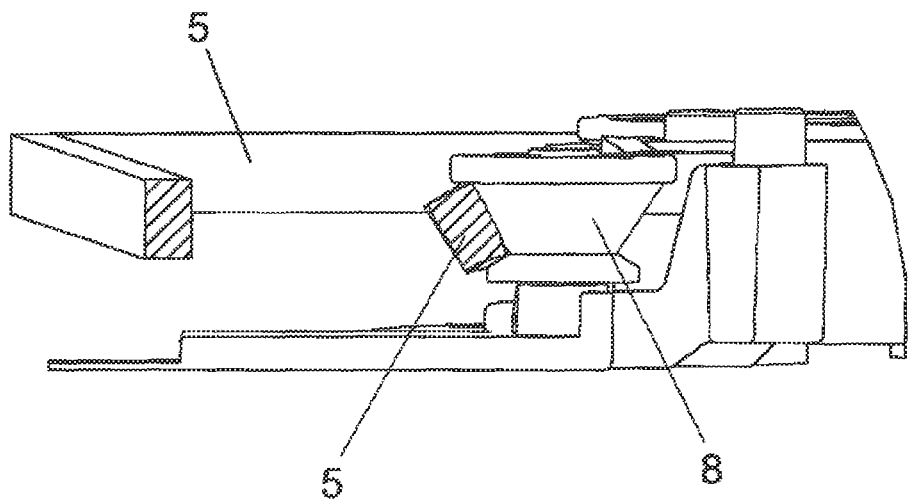
FIG. 4 is a section of the conveyor, taken according to an IV-IV cutting line of FIG. 3.
Figure 5:
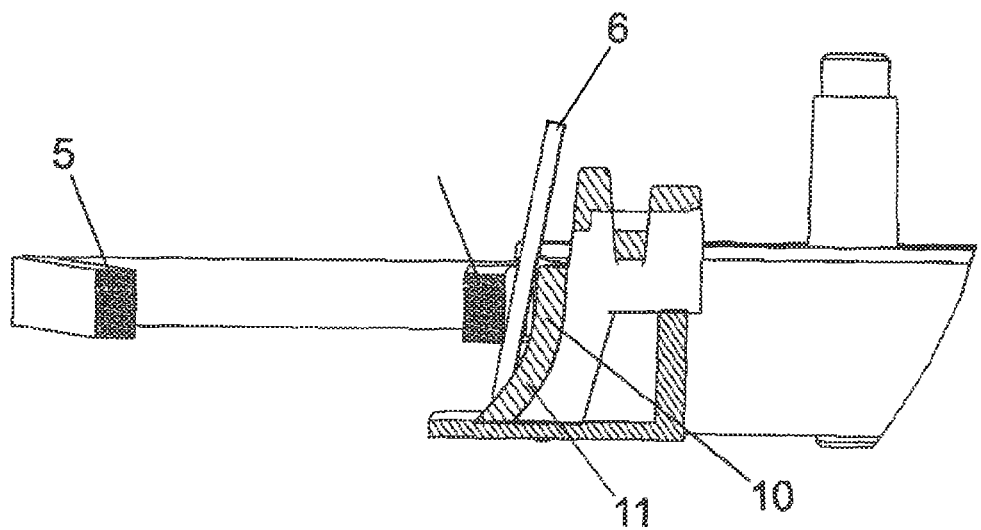
FIG. 5 is a similar section, taken according to the V-V cutting line of FIG. 3.
Figure 6:
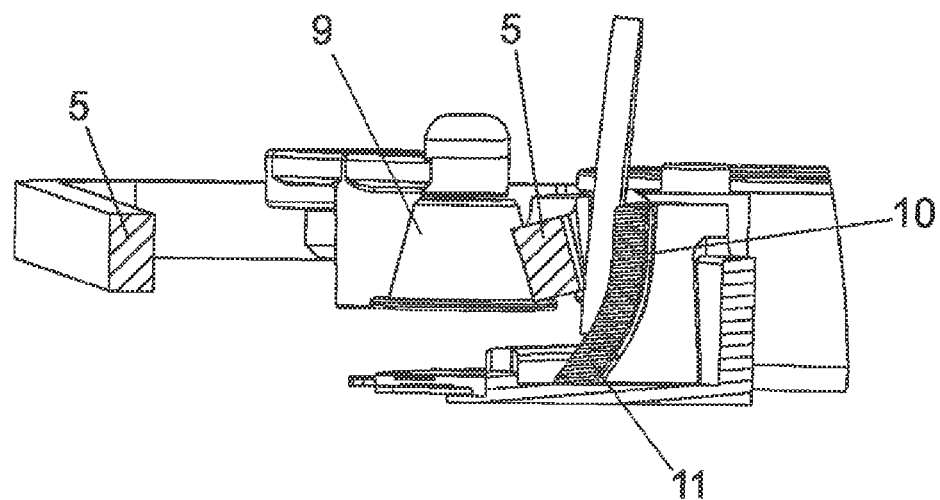
FIG. 6 shows another section of the conveyor, taken according to the VI-VI cutting line of FIG. 3.

In the first segment (1) of the channel, the belt (5) is laterally supported, on its inner and outer surfaces, on two conical rollers (8 and 9) which shafts are parallel to the shafts of the pulleys and taper in different directions, causing the warping of the belt (5), as shown in FIGS. 4 to 6, making it converge towards the opposite wall (10), which is fixed and is curved in the descending direction towards the mobile wall defined by the belt (5). This way, the first segment (1) of the channel is limited only by a mobile wall, constituted by the belt (5), and a fixed wall (10), which lower section (11), curved towards the mobile wall, serves as means of support for the coins (16), as shown in FIG. 5. As shown in FIG. 3, the conical roller (9) is mounted on a tensioner (9').

The second segment (2) is limited, FIGS. 1 and 3, by the endless belt (5), which constitutes a longitudinally movable wall, by an opposite fixed wall (10), and by an also fixed bottom (12). In this second segment (2), there are means in charge of driving the coins (6) running through this second segment towards the bottom (7) thereof. In the example shown in FIGS. 1 to 3 and 7 to 11, these means consist of a trigger (13) arranged in front of the channel and driven towards said channel, which function will be exposed below.

The third segment (3) of the channel is limited, FIGS. 1 and 3, by the belt (5), which constitutes a longitudinally movable wall, by the lateral surface of a freely rotating cylindrical roller (14), and by the same fixed bottom (12) than the second segment (2).

Lastly, the fourth segment (4) of the channel is limited by the belt (5), an opposite fixed wall (15), FIG. 3, and the same fixed bottom (12), FIG. 2.

The first segment (1) runs between the truncated cone-shaped rollers (8 and 9). The second segment (2) runs between the truncated cone-shaped roller (9) and the point where the tangency of the belt (5) and the cylindrical roller (14) begins. The third segment runs along the surface of tangency between the belt (5) and the cylindrical wheel (14) in an arch of approximately 90°. Lastly, the fourth segment (4) begins at the final point of tangency between the belt (5) and the cylindrical wheel (14) and ends at the exit of said segment.

FIG. 1 shows the path of the coins through the conveyor of the invention in a schematic manner. The coins (16) access the conveyor through an inlet or coin guide (17) after having been extracted and validated one by one by a Hopper and a coin sensor, not represented. The coins (16) arrive to the first segment (1) of the channel, where they are collected by means of the belt (5), actuated by means of a motor, not represented. As shown in FIGS. 4, 5 and 6, the section of the belt is rectangular. Preferably, this belt will be toothed in its inner and outer faces to facilitate, on the one hand, the transportation of the coins, and on the opposite, the transmission of the mechanical traction from a motor, not represented. In the direction of travel of the coins, the second ascending segment (2) is found next, where the coin is aligned and referenced against the fixed bottom (2) by means of the trigger (13). The cylindrical roller (14) is located in the third segment (3), with which we achieve a 90° change in the direction of the coins and a separation of two coins that are close to each other, as will be explained below.

FIG. 2 is another view of the transportation device proposed herein, showing the trajectory of the coins between the entrance zone (17), the first segment (1) of the channel, and the fourth segment (4) of the channel constituting the exit, where a sorter of the coins, either by denomination or by diameter, is arranged, which are techniques that are well known in this type of applications.

Three aspects of the invention will be described below, which consist of the reception of the coins one by one in the first segment (1) of the channel, the alignment of the coins during the path thereof through the second segment (2) of the channel, the correct separation among the coins in the third segment (3) of the channel, and the delivery of the coins one by one with a correct separation in the fourth segment (4) of the channel, substantially horizontal, for the subsequent sorting thereof.

The first aspect indicated above consists of the reception of the coins (16) by a conveyor based on a belt (5) that collects the coins one by one coming from a channel (17) through which said coins move through the action of gravity. The conveyor must work regardless of the dimensions of the coins and has the particularity that said coins reach the reception zone with a direction of travel sensibly perpendicular with respect to the movement of the belt in its second ascending segment (2). FIG. 3 shows the mechanism object of the invention in detail, especially the coin reception, transportation, separation and delivery segments.

As provided above, the conveyor is composed of a transportation belt (5) with a rectangular section, preferably toothed in both faces, given that in the first segment (1), the coin collection zone, it is subjected to a warping on its longitudinal axis, together with a change of direction in its trajectory, with which a tapered coin collection zone is achieved, such that the coins, regardless of their diameter and width, interfere with the belt (5), and due to friction with the same, are led in the ascending direction. The warping and change of direction of the belt (5) are achieved through the action of two conical rollers (8 and 9) arranged in the coin collection zone, one in the lower part and another in the upper part, according to the direction of travel of the belt (5).

FIG. 4 shows a detail of the mechanism according to an IV-IV cut of FIG. 3. The warping of the belt (5) is achieved through the joint action of the truncated cone-shaped rollers (8 and 9), FIGS. 4 and 6.

FIG. 5 shows a detail of the coin reception zone, according to the V-V section of FIG. 3, where the belt (5) has the established warping to allow the entrance of the coins, and the interference of the coins with the belt (5) is achieved through the reduction of the section of the collection zone, thanks to the warping of the belt (5) and the shape of the fixed wall (10) on which the coins will be supported. This way, the collection by the belt (5) of the coins reaching the first segment (1) is ensured. The minimum separation between the belt (5) and the fixed wall (10) will be smaller than the space occupied by the coin with the minimum admissible thickness when supported on the lower part between the belt (5) and the wall (10).

FIG. 6 shows another detail of the mechanism, according to the VI-VI cut of FIG. 3, showing the reduction in the section of the first segment (1) of the channel, constituting the coin reception zone, to ensure the correct transportation thereof. The warping of the belt (5) is maintained due to the truncated cone shape of the conical roller (9), which is preferably mounted on a tensioner (9'), thereby facilitating the passage of the coins in the transportation zone where the section between the belt (5) and the fixed wall (10) is reduced. Once it abandons the pulley (9), the belt (5), in the direction of travel, gradually loses the warping described above, thereby ensuring the correct transportation of the coins.

Figure 7:
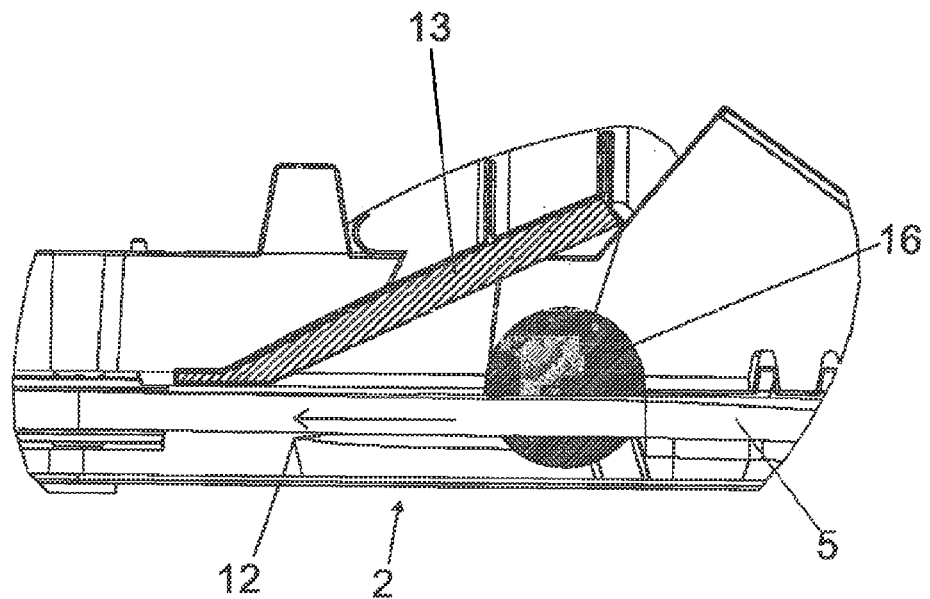
FIGS. 7 to 11 show a sequence of alignment of the coin along a second coin transportation and alignment segment.

A second aspect of the invention consists of the alignment of the coins on a surface of reference. FIG. 7 shows a lateral view of the second ascending segment (2) of the coins, where one coin (16) has left the first segment of the channel (1), and, as represented in this figure, is being transported by the belt (5) but at a certain distance from the plane of reference, constituted by a bottom (12) of the channel. In this type of mechanisms, it is important for the coins to be transported by ensuring that, regardless of their size, they are mechanically referenced to a support surface, such that they are diverted by means of different outlets depending on their size or denomination. In the conveyor of the invention, the alignment of the coin (16) with the surface of reference (12) is achieved thanks to the action of the trigger (13), which is kept at rest through the action of a spring, not represented. The affect of the alignment achieved by the trigger (13) is improved by maintaining the surface of reference, the bottom (12), between the first segment (1) and the third segment (3), located at different heights, with an inclination towards the rear part in the ascending direction, as shown in FIG. 1.

Figure 8:
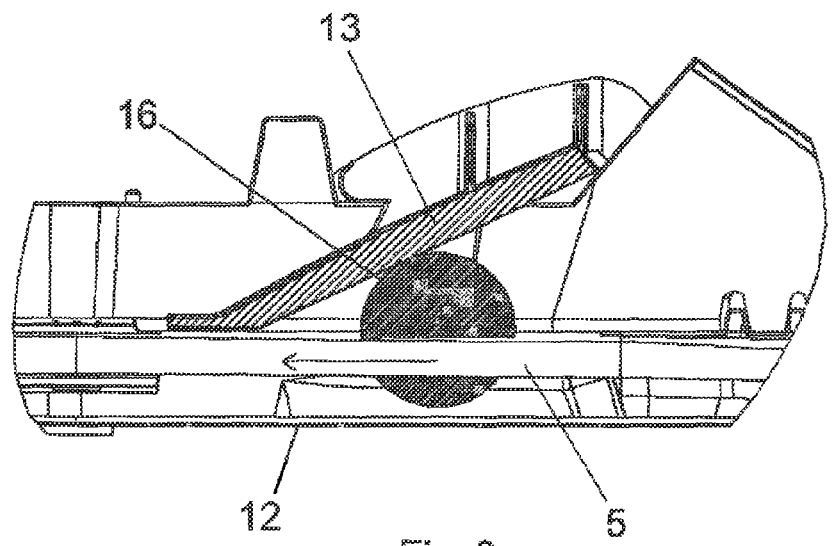

FIG. 8 shows the arrival of the coin (16) to the trigger (13) before the undertaking of the alignment function with respect to the surface of the bottom (12).

Figure 9:
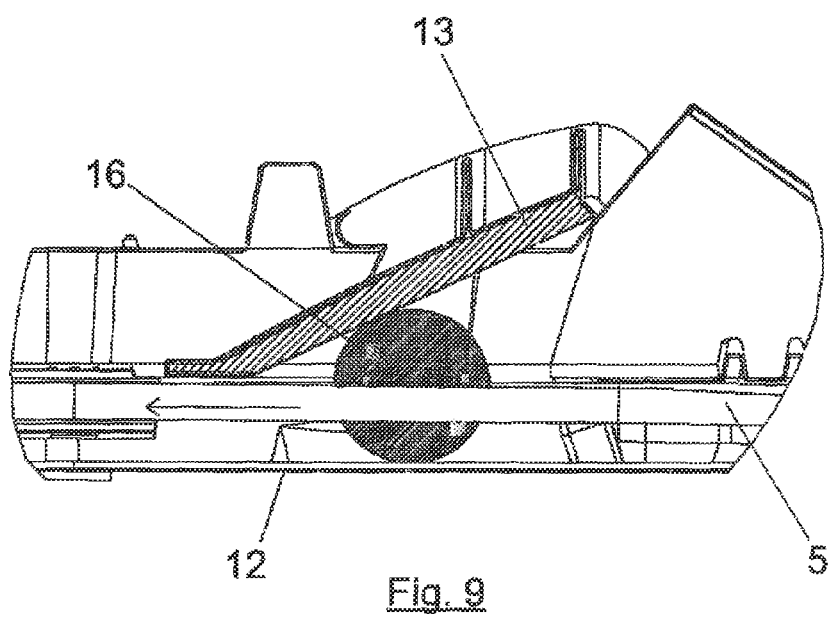

FIG. 9 shows the effect of the trigger (13) on the alignment of the coin (16), with the surface of reference defined by the bottom (12).

Figure 10:
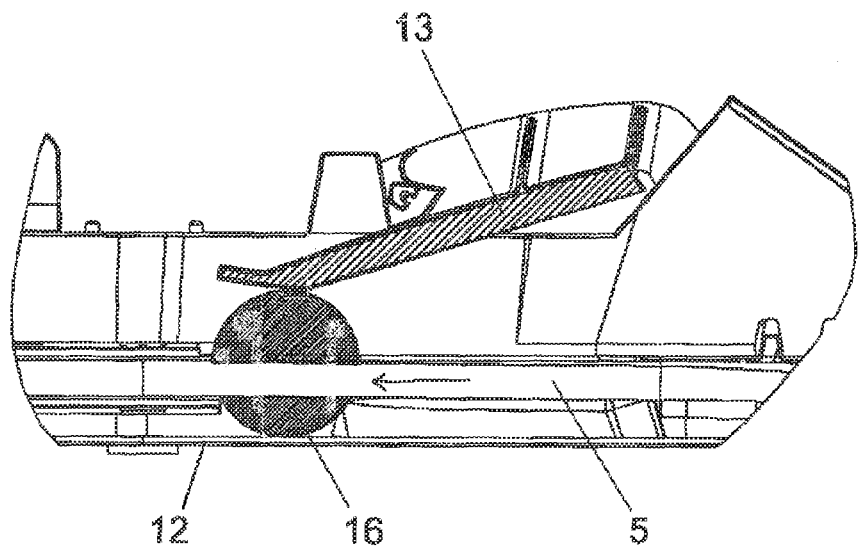

FIG. 10 shows, according to the direction of travel of the coin, the way in which the trigger (13) moves and keeps the coin aligned thanks to the forced exerted by a spring, not represented.

Figure 11:
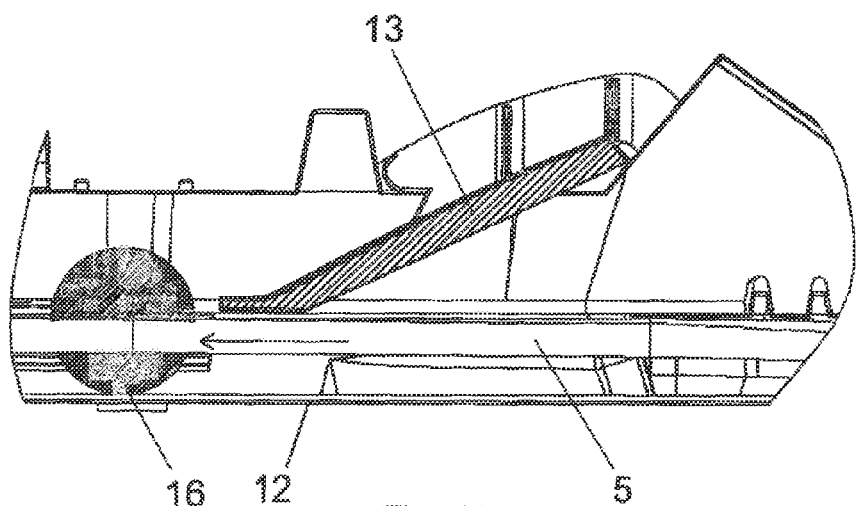

FIG. 11 shows the following sequence in the travel of the coins (16), where the trigger (13) is kept at rest and the coin continues in its ascending trajectory, correctly aligned with the bottom surface (12).

Figure 12:
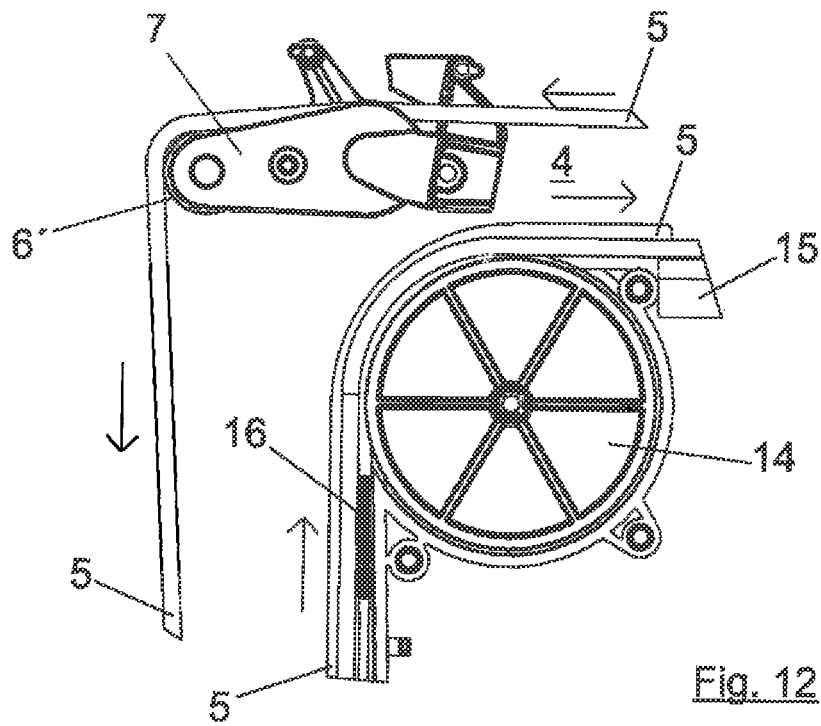
FIG. 12 shows a plant view of a third coin separation segment of the conveyor of the invention.
Figure 13:
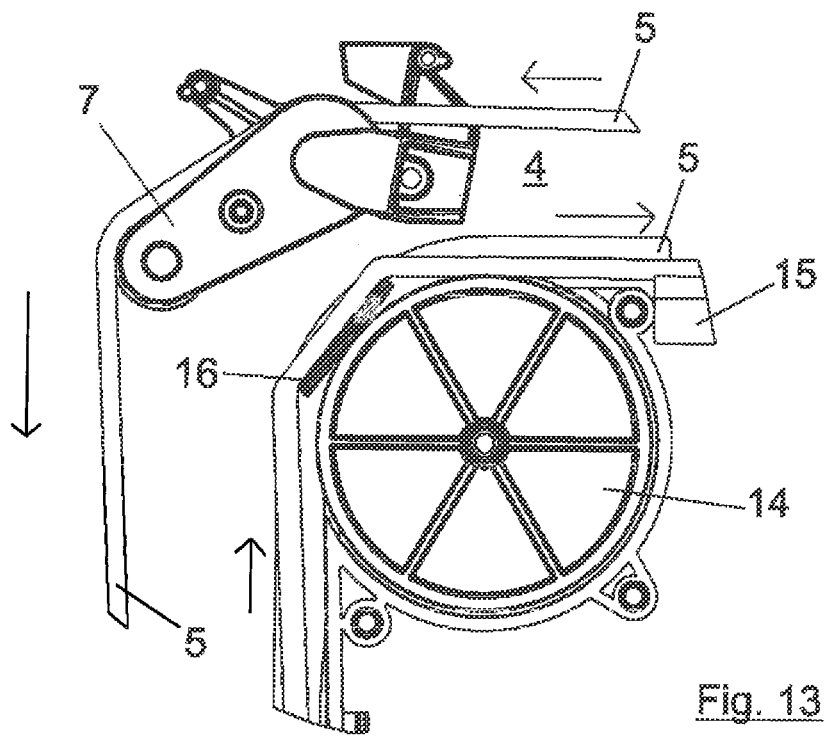
FIGS. 13 to 17 are similar to the view of FIG. 12, showing different steps and situations of the transportation of coins.
Figure 14:
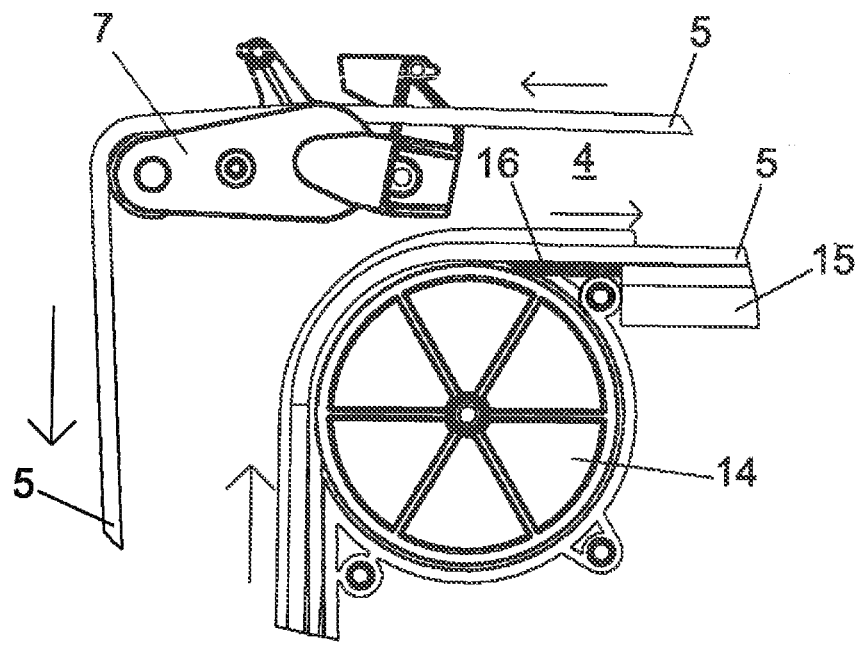
Figure 15:
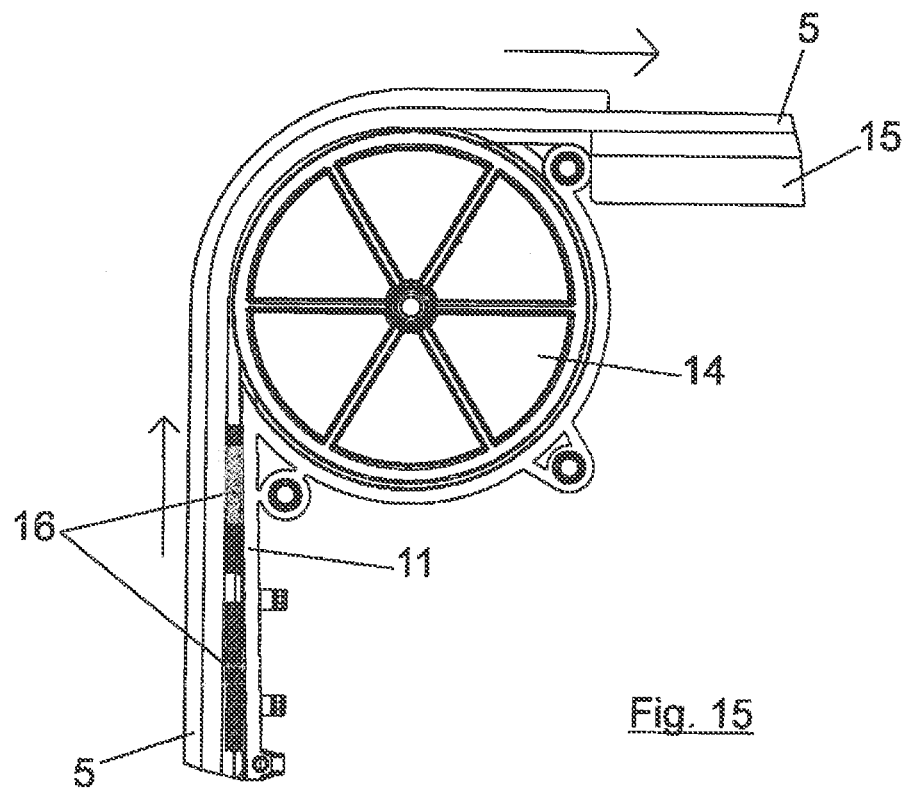
Figure 16:
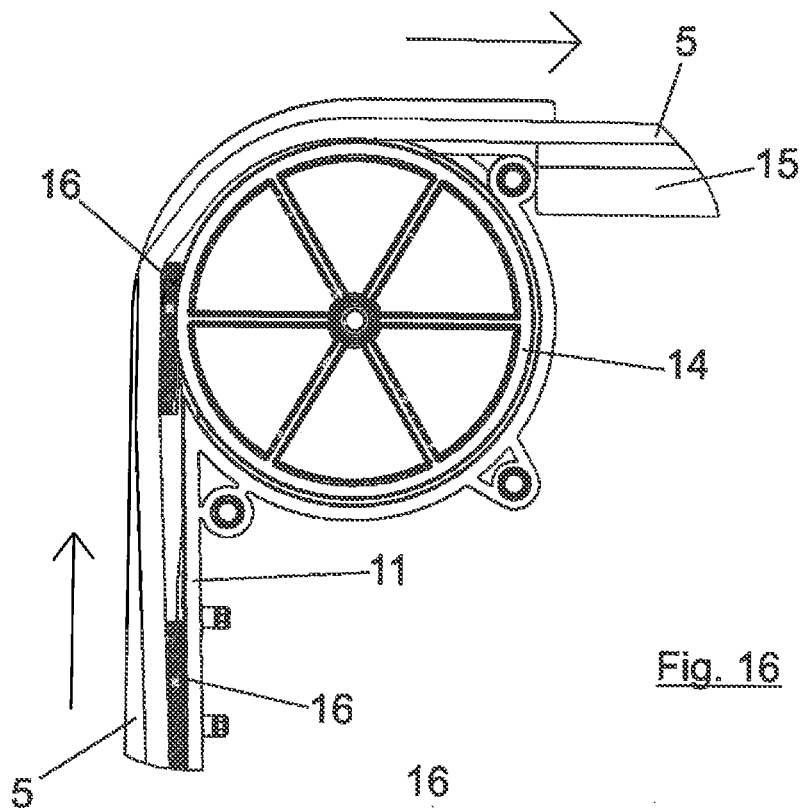
Figure 17:
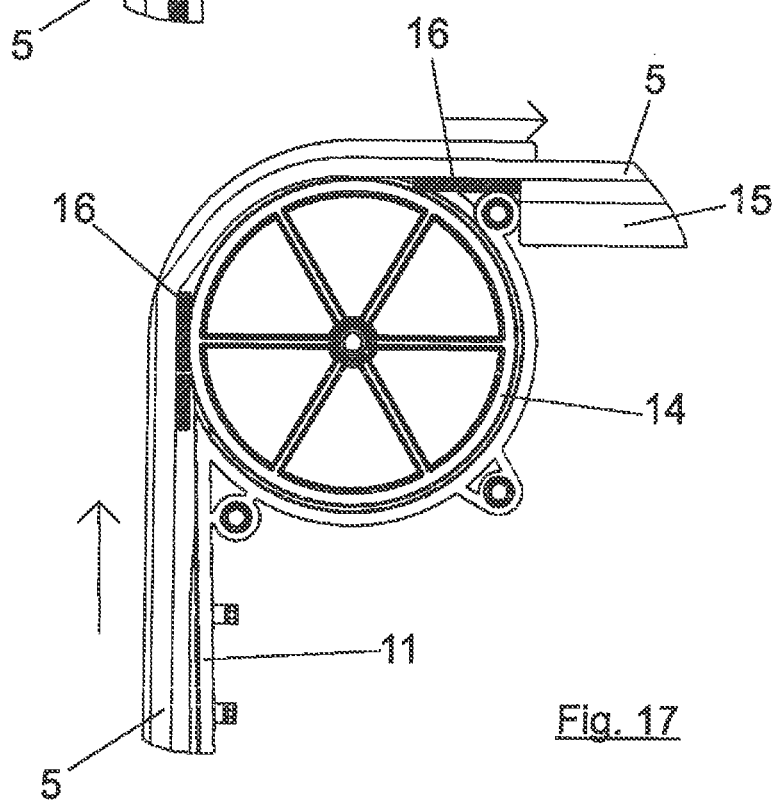

The third aspect of the invention consists of the delivery of the coins to a fourth segment (4), substantially horizontal, where the coins, in addition to arriving aligned to a reference to the rear, must be delivered with a sufficient separation among them to facilitate the sorting step carried out in the aforementioned horizontal segment. FIG. 12 shows the upper part of the second segment (2), where the coin (16) transported by the belt (5) is reaching the cylindrical roller (14) of the third section (3) and at which exit is the fourth horizontal segment (4). The transportation belt (5) passes through a pulley (6') with a tensioner (7) than maintains the tension of the belt and absorbs the changes of the development of the path thereof due to the support on the coins. FIG. 13 shows a coin in its path between the belt (5) and on the cylindrical roller (14). The change of path of the belt (5) is absorbed by means of the rotation of the tensioner (7), which is pre-tensioned by a spring, not represented. FIG. 14 represents the coin (16) at the exit of the cylindrical roller (14), entering the fourth horizontal segment (4), and the return to the initial state of the tensioner (7). FIG. 15 represents two adjacent coins (16) with a very small gap between them. In some applications where the sorting is electromechanical and done at high speeds, a sufficient separation to ensure the correct operation is required, due to which the situation of the coins represented in FIG. 15 is unacceptable. The solution proposed can be seen in FIGS. 16 and 17, where the first coin, at the beginning of the path on the cylindrical roller (14), separates the belt (5) from the fixed wall (11), such that the second coin separates from the first thanks to the fact that this segment is in the ascending direction. In addition, due to the inclination of the second segment (2) towards the rear part, the second coin is kept aligned with the rear part or bottom of the channel (12). This way, the coins will exit towards the fourth horizontal segment (4) with the convenient separation for the delivery thereof to the sorter.

Figure 18:
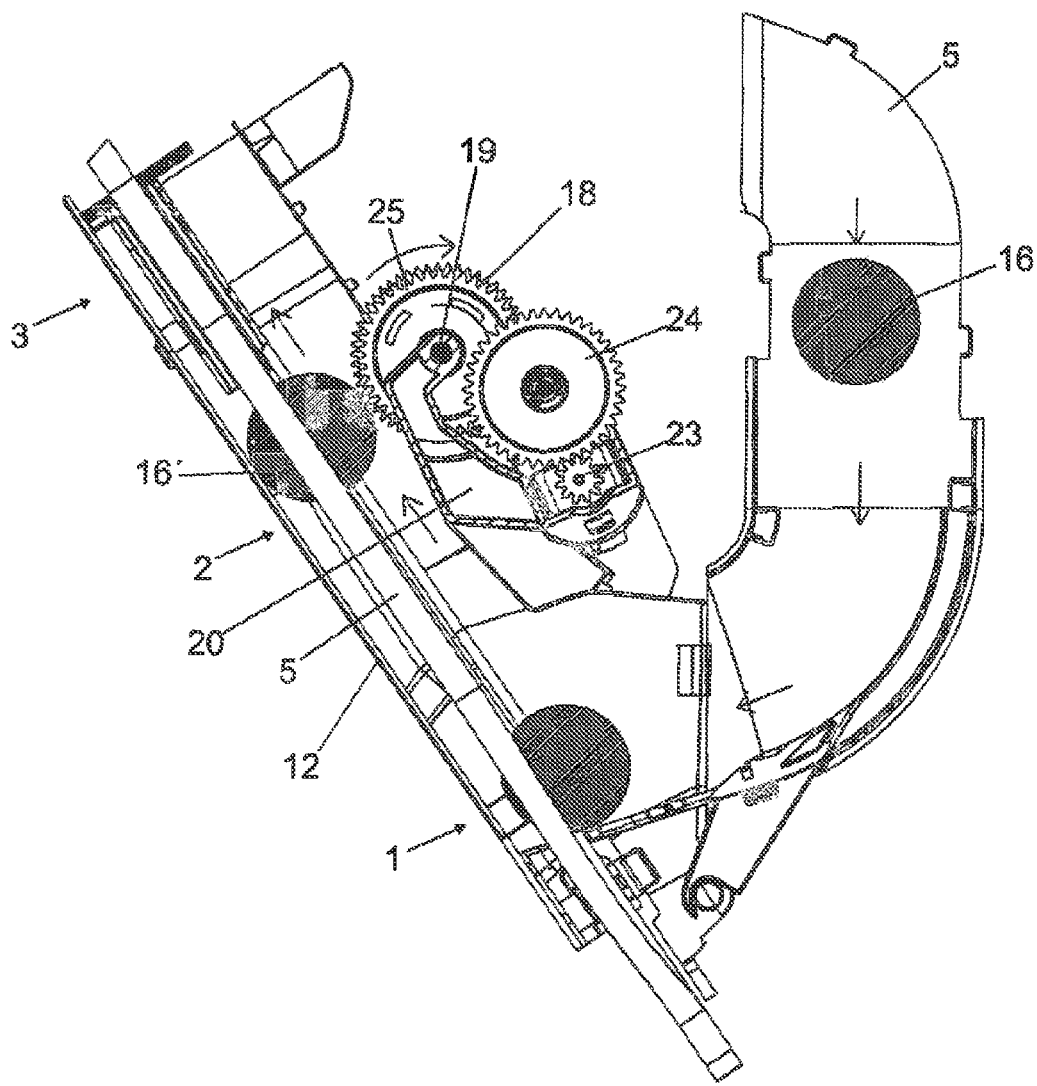
FIG. 18 is similar to the view of FIG. 1, showing a different embodiment.
Figure 19:
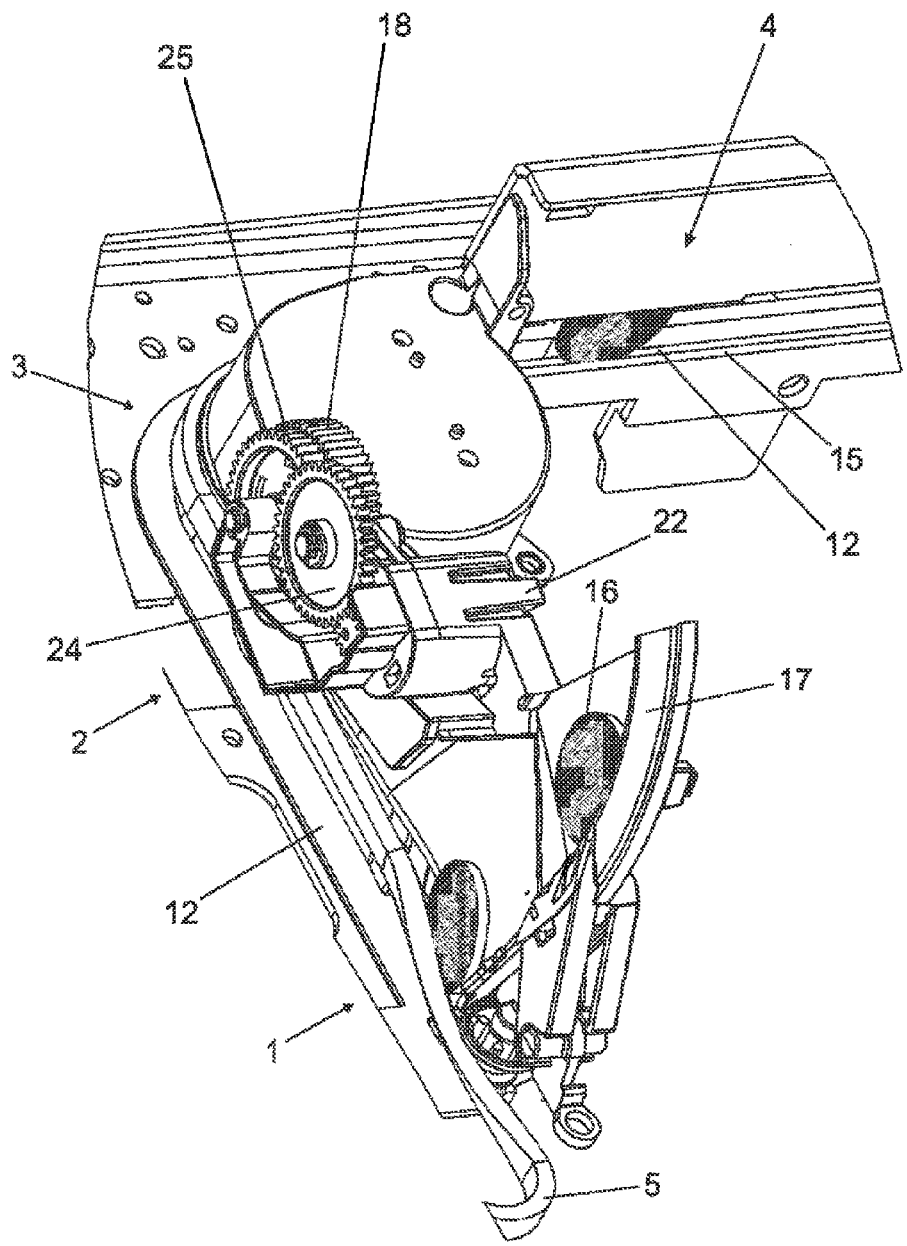
FIG. 19 is a perspective figure of the mechanism in FIG. 18.

FIGS. 18 and 19 show a different embodiment where the means in charge of driving the coins (16) towards the bottom (12) comprise a rotating wheel (18) supported on the rim of the coins (16') running through this second segment (2) of the channel. The axle of the rotating wheel (18) is parallel to the bottom (12) of the channel and is perpendicular of the direction of movement of the coins (16') along the length of said channel.

Figure 20:
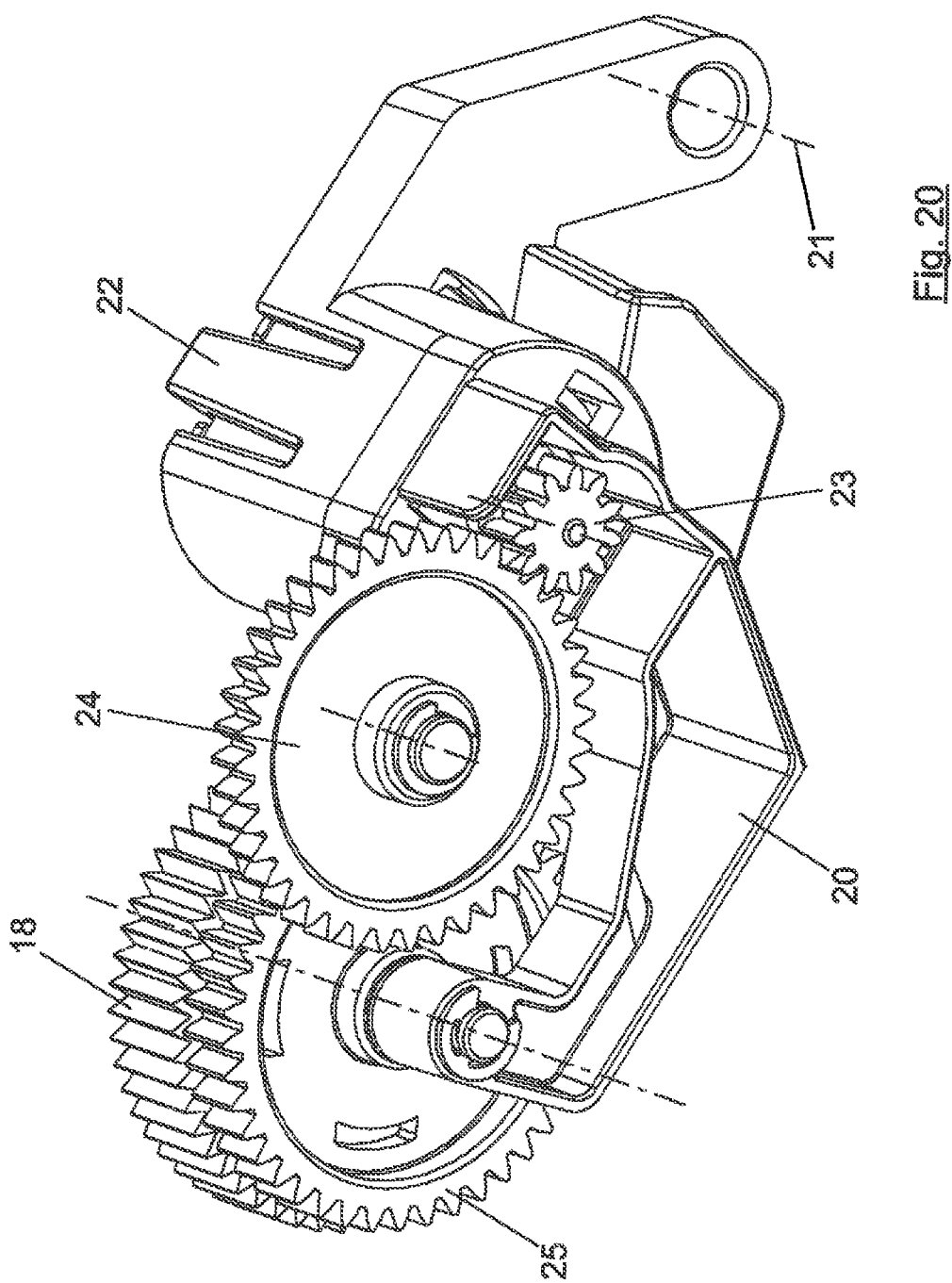
FIG. 20 is a perspective of the means in charge of driving the coins towards the bottom of the channel.
Figure 21:
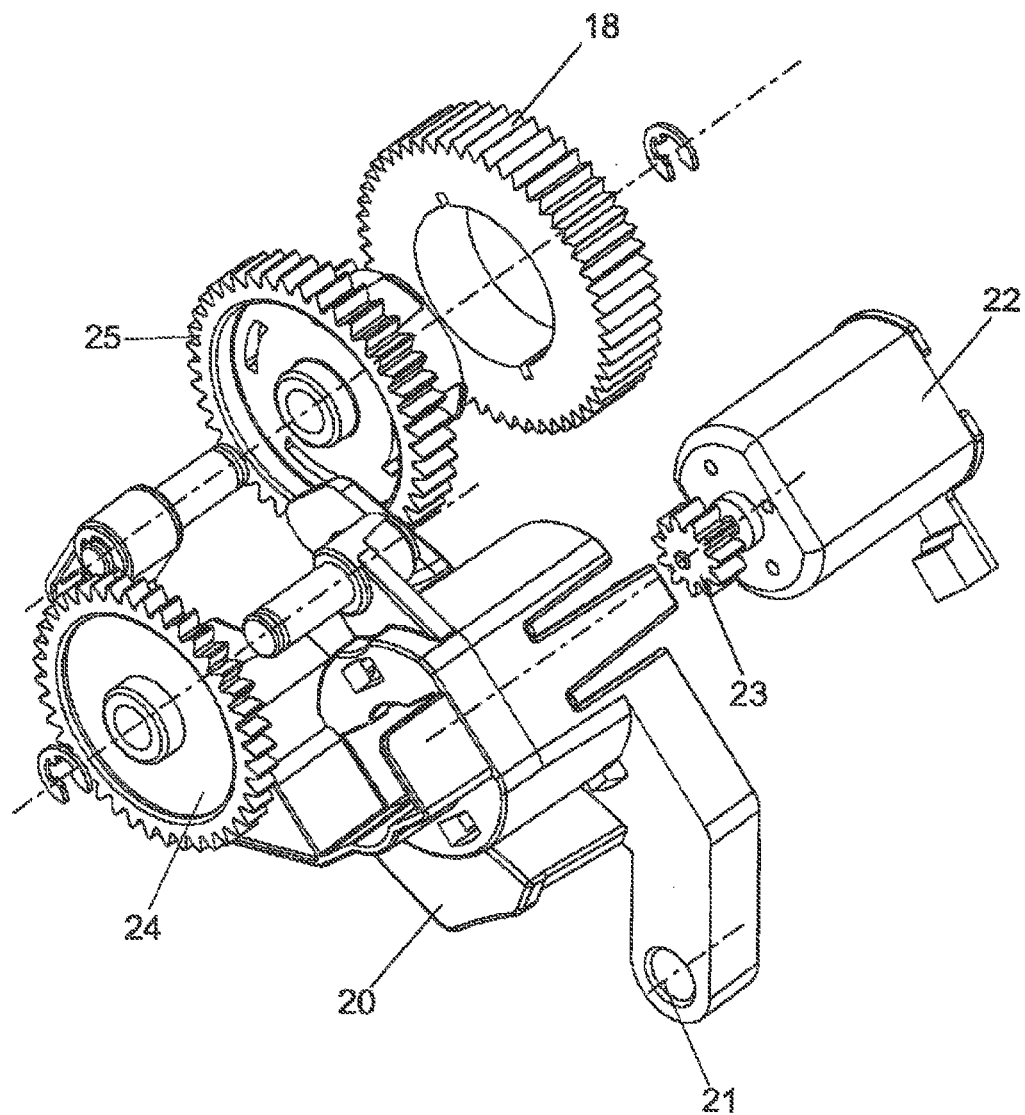
FIG. 21 is an exploded perspective view of the set of FIG. 20.

The wheel (18) is mounted, according to its rotation axis (19), on a support (20) that is located in front of the second segment (20) of the channel and can pivot around a hinge shaft (21), FIGS. 20 and 21, parallel to the axle (19) of the wheel (18). In addition, the support (20) is driven towards the bottom (12) of the channel by means of a spring, not represented.

Figure 22:
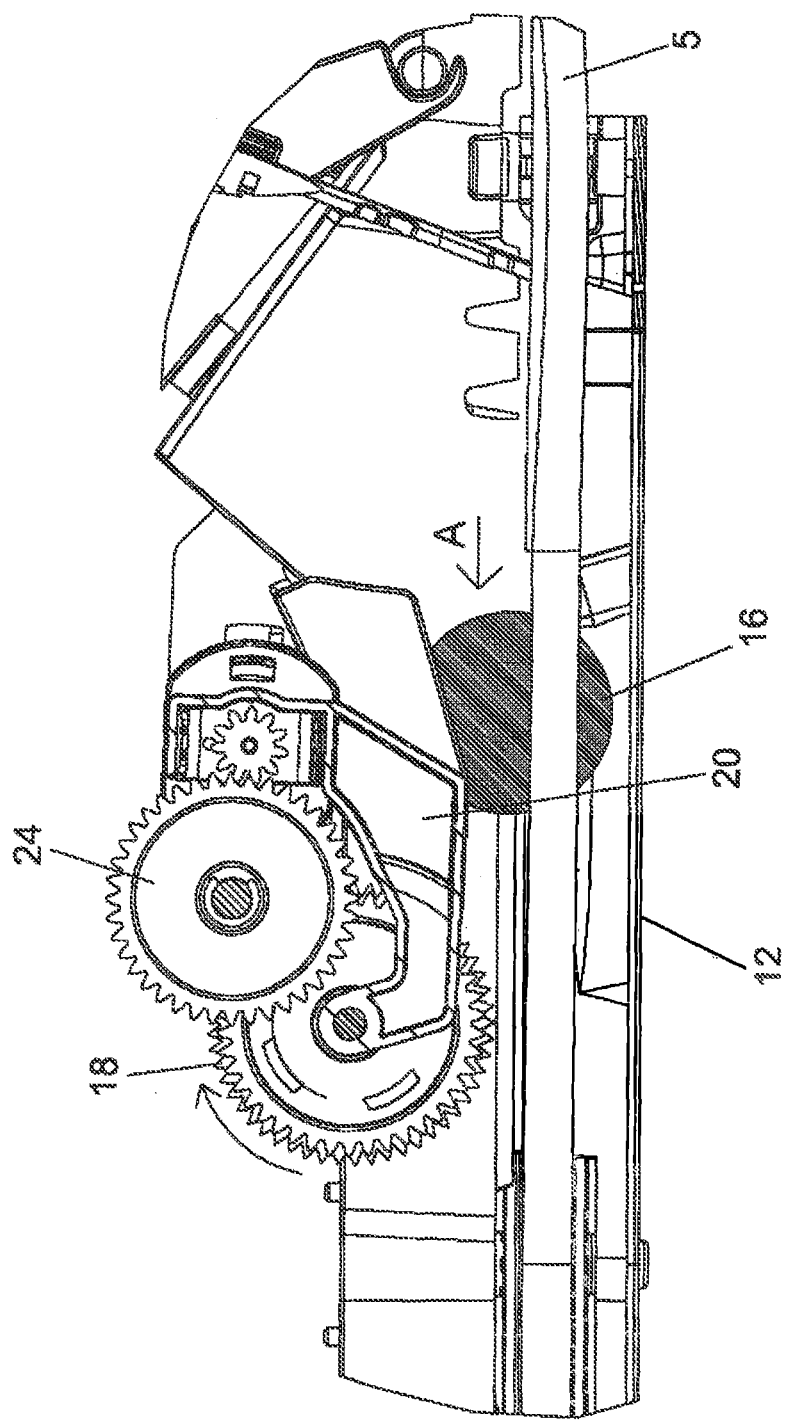
FIGS. 22 to 24 show three consecutive sequences representing the compensation effect of the means represented in FIGS. 21 and 22.
Figure 23:
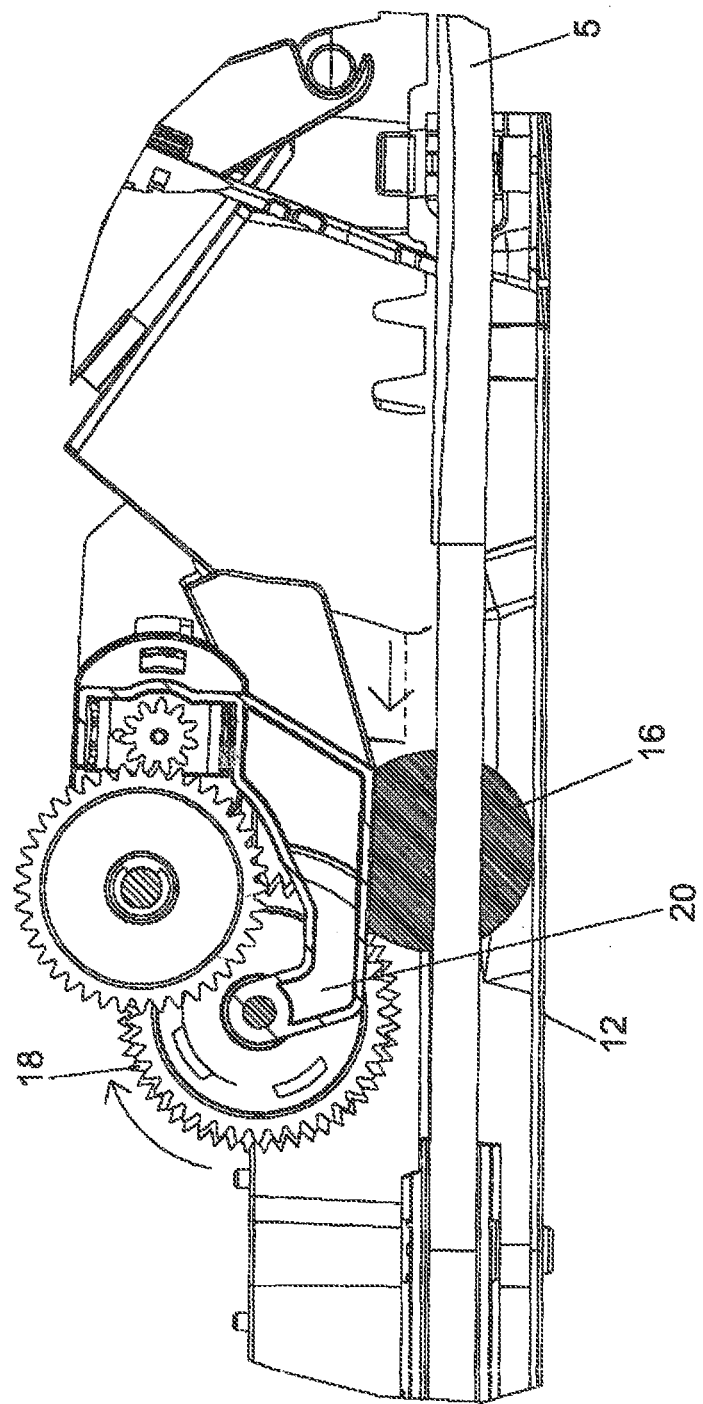

With the constitution described above, the support (20) can pivot around the hinge shaft (21) between a position of minimum separation from the bottom (12) of the channel, where the wheel (18) must be separated from the bottom (1.2) of the channel a distance smaller than the diameter of the coin with the smallest diameter admissible by the conveyor, FIG. 22, in a position of maximum separation, where the wheel (18) is separated from the bottom (12) of the channel a distance at least equal to the diameter of the coin with the greatest admissible diameter, FIG. 23.

In the example described above, the wheel (18) is mechanically actuated by a motor (22), FIGS. 2 to 4, through a reduction mechanism, composed by the pinions (23, 24 and 25), FIGS. 20 and 21. This arrangement has the advantage that the wheel (18) becomes a drive wheel and does not stop the coin (16'), eliminating the risk of jamming. However, the wheel (18) could simply consist in a freely rotating wheel that rotates by being supported on the coin (16') due to the movement of said coin.

In order to improve the operation of the mechanism described above, it has been provided that the rotating wheel (18) can be made of a material with a high friction coefficient with the rim of the coin (16'), for example, based on an elastomer and/or presenting an axially toothed profile surface. Preferably, the peripheral velocity of the rotating wheel will be similar to the movement velocity of the coins (16'), that is to say, to the dragging belt (5). The rotating wheel (18) could also be actuated based on the same mechanism that actuates the belt (5), or even by the belt itself through a transmission, not represented.

Figure 24:
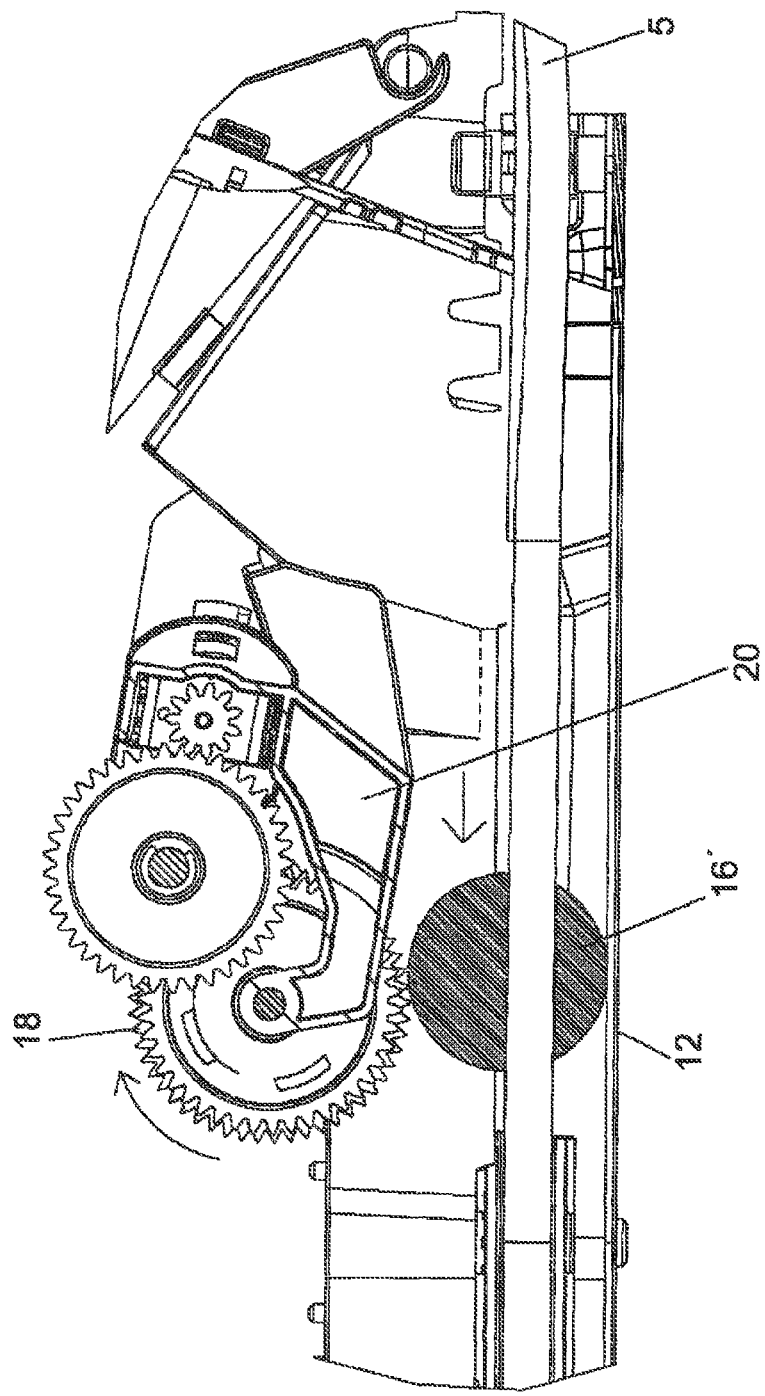

FIG. 22 shows the support (20) and wheel (18) in the position of minimum separation from the bottom (12) of the channel, without there being any coin under the rotating wheel (18). The coins (16) move in the direction of the arrow A until they are supported on the periphery of the rotating wheel (18), which elastically drives it towards the bottom (12) of the channel, until it is supported on the same, FIG. 23. As the coin (16) moves forward, dragged by the belt (5), it pushes the rotating wheel (18) and support (20), until it reaches the position (16') of FIG. 24, where it achieves the full support of the coin on the bottom (12) of the channel and the position of maximum separation of the support (20) and rotating wheel (18) from the bottom of the channel (12). All of the foregoing is achieved thanks to the pivoting capacity of the support (20) around the hinge shaft (21), FIGS. 20 and 21, and the action of the spring, not represented, moving said support towards the position of minimum separation from the bottom (12) of the channel, FIG. 22.

The invention claimed is:

1. A coin conveyor for coin processing machines running between a coin collection zone and a coin delivery zone located above the coin collection zone, characterized by a channel that comprises:
   a first coin reception segment, where the channel is defined by a longitudinally movable wall and by an opposite fixed wall, both converging towards each other towards the inside of said channel;
   a second coin transportation and alignment segment, where the channel is defined by the longitudinally movable wall, by the opposite fixed wall and by a fixed bottom;
   a third coin separation segment, where the channel is defined by a lateral surface of a freely rotating cylindrical roller, by the longitudinally movable wall, by the opposite fixed wall supported on the lateral surface of said cylindrical roller along the length of an arch of approximately 90°, and by the fixed bottom;
   a fourth coin delivery segment, where the channel is defined by the longitudinally movable wall and by the fixed bottom;
   the second segment having means to drive coins running along the second segment towards the bottom of said second segment;
   the longitudinally movable wall of all segments being constituted by a single endless belt being mounted on pulleys; and
   along the length of the first segment, the endless belt is supported, through its inner and outer surfaces, on the lateral surfaces of two conical rollers limiting the first segment, having shafts parallel to the shafts of the pulleys on which the belt is mounted and tapered in different directions, the conical rollers causing the transversal inclination of the belt, converging with the fixed wall towards the inside of the channel.

2. The conveyor of claim 1, wherein along the first segment of the channel, the fixed wall is transversally curved, at least in its inner portion, the concavity being directed towards the longitudinally movable wall, with which it converges by its inner longitudinal edge.

3. The conveyor of claim 1, wherein the fixed bottom of the second, third and fourth segments of the channel is defined by a flat and continuous platform.

4. The conveyor of claim 1, wherein in the first segment of the channel, the longitudinally movable wall and the fixed wall converge towards each other in the transversal direction towards the inside of the channel, and in the longitudinal direction towards the direction of travel of the longitudinally movable wall.

5. The conveyor of claim 1, wherein one of the pulleys on which the endless belt is mounted has an elastic tensioner for said belt.

6. The conveyor of claim 1, wherein the endless belt has a rectangular section, with transversally toothed inner and outer surfaces.

7. The conveyor of claim 1, wherein the third coin separation segment is located at a height above the first coin reception segment, the channel running between said segments with a backwards inclination in the ascending direction, while along the fourth segment, the channel runs longitudinally in the horizontal position.

8. A coin conveyor for coin processing machines running between a coin collection zone and a coin delivery zone located above the coin collection zone, characterized by a channel that comprises:
- a first coin reception segment, where the channel is defined by a longitudinally movable wall and by an opposite fixed wall, both converging towards each other towards the inside of said channel;
- a second coin transportation and alignment segment, where the channel is defined by the longitudinally movable wall, by the opposite fixed wall and by a fixed bottom;
- a third coin separation segment, where the channel is defined by a lateral surface of a freely rotating cylindrical roller, by the longitudinally movable wall, by the opposite fixed wall supported on the lateral surface of said cylindrical roller along the length of an arch of approximately 90°, and by the fixed bottom;
- a fourth coin delivery segment, where the channel is defined by the longitudinally movable wall and by the fixed bottom;
- the second segment having means to drive coins running along the second segment towards the bottom of said second segment;
- the longitudinally movable wall of all segments being constituted by a single endless belt being mounted on pulleys and;
- the means to drive the coins towards the bottom of the second segment of the channel is a trigger located in front of the channel and driven elastically towards the bottom thereof, which trigger is separated from the bottom of the channel, in an at rest position, in a distance smaller than the diameter of the coins.

9. The conveyor of claim 8, wherein along the first segment of the channel, the fixed wall is transversally curved, at least in its inner portion, the concavity being directed towards the longitudinally movable wall, with which it converges by its inner longitudinal edge.

10. The conveyor of claim 8, wherein the fixed bottom of the second, third and fourth segments of the channel is defined by a flat and continuous platform.

11. The conveyor of claim 8, wherein in the first segment of the channel, the longitudinally movable wall and the fixed wall converge towards each other in the transversal direction towards the inside of the channel, and in the longitudinal direction towards the direction of travel of the longitudinally movable wall.

12. The conveyor of claim 8, wherein one of the pulleys on which the endless belt is mounted has an elastic tensioner for said belt.

13. The conveyor of claim 8, wherein the endless belt has a rectangular section, with transversally toothed inner and outer surfaces.

14. The conveyor of claim 8, wherein the third coin separation segment is located at a height above the first coin reception segment, the channel running between said segments with a backwards inclination in the ascending direction, while along the fourth segment, the channel runs longitudinally in the horizontal position.

15. A coin conveyor for coin processing machines running between a coin collection zone and a coin delivery zone located above the coin collection zone, characterized by a channel that comprises:
- a first coin reception segment, where the channel is defined by a longitudinally movable wall and by an opposite fixed wall, both converging towards each other towards the inside of said channel;
- a second coin transportation and alignment segment, where the channel is defined by the longitudinally movable wall, by the opposite fixed wall and by a fixed bottom;
- a third coin separation segment, where the channel is defined by a lateral surface of a freely rotating cylindrical roller, by the longitudinally movable wall, by the opposite fixed wall supported on the lateral surface of said cylindrical roller along the length of an arch of approximately 90°, and by the fixed bottom;
- a fourth coin delivery segment, where the channel is defined by the longitudinally movable wall and by the fixed bottom;
- the second segment having means to drive the coins running along the second segment towards the bottom of said second segment;
- the longitudinally movable wall of all segments being constituted by a single endless belt being mounted on pulleys; and
- the means to drive the coins towards the bottom of the second segment of the channel consist of a rotating wheel with an axle parallel to the bottom of the second segment of the channel and perpendicular to the direction of the movement of the coins along the length of said second segment of the channel, supported on the rim of the coins, which rotating wheel is arranged on a support mounted in front of the channel by means of a hinge shaft parallel to the axle of the wheel and elastically driven towards the bottom of the channel, which can pivot around the hinge shaft between a position of minimum separation, where the wheel is separated from said bottom a distance smaller than the diameter of the coin with the smallest admissible diameter, and a position of maximum separation, where the wheel is separated from the bottom a distance at least equal to the diameter of the coin with the greatest admissible diameter.

16. The conveyor of claim 15, wherein the rotating wheel is provided with an no-skid peripheral finish, with respect to the rim of the coins.

17. The conveyor of claim 16, wherein the peripheral finish consists of a transversal tooth.

18. The conveyor of claim 16, wherein the peripheral finish consists of a coating layer based on an elastic material and a high friction coefficient with the rim of the coin.

19. The conveyor of claim 16, wherein the wheel can freely rotate.

20. The conveyor of claim 15, wherein the rotating wheel is related to an actuation mechanism that causes the rotation of said wheel with a tangential velocity matching the movement velocity of the coin along the second segment of the channel.

21. The conveyor of claim 15, wherein along the first segment of the channel, the fixed wall is transversally curved, at least in its inner portion, the concavity being directed towards the longitudinally movable wall, with which it converges by its inner longitudinal edge.

22. The conveyor of claim 15, wherein the fixed bottom of the second, third and fourth segments of the channel is defined by a flat and continuous platform.

23. The conveyor of claim 15, wherein the first segment of the channel, the longitudinally movable wall and the fixed wall converge towards each other in the transversal direction towards the inside of the channel, and in the longitudinal direction towards the direction of travel of the longitudinally movable wall.

24. The conveyor of claim 15, wherein one of the pulleys on which the endless belt is mounted has an elastic tensioner for said belt.

25. The conveyor claim 15, wherein the endless belt has a rectangular section, with transversally toothed inner and outer surfaces.

26. The conveyor of claim 15, wherein the third coin separation segment is located at a height above the first coin reception segment, the channel running between said segments with a backwards inclination in the ascending direction, while along the fourth segment, the channel runs longitudinally in the horizontal position.

* * * * *